March 19, 1935.   J. C. KARNES   1,994,474
OPTICAL SYSTEM
Filed July 15, 1933
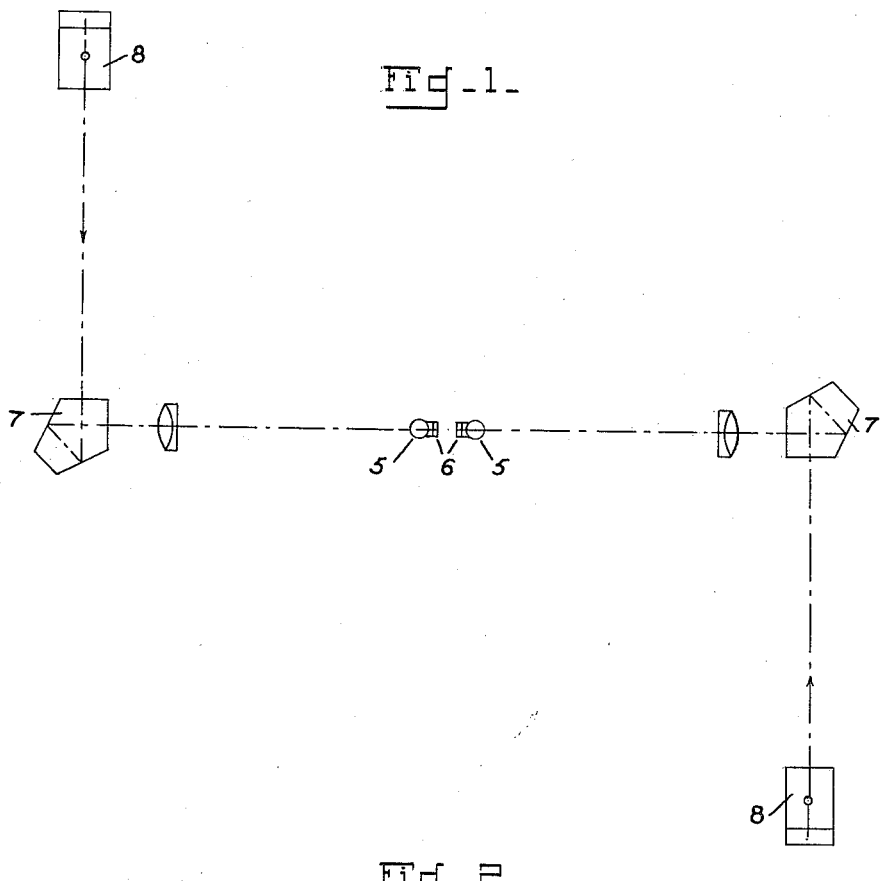
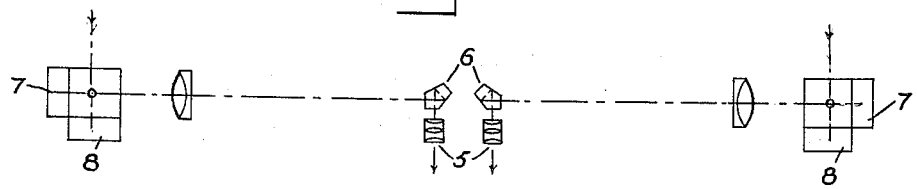
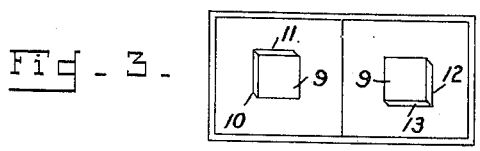
Inventor
James C. Karnes
By Wm. Roach
Attorney Patented Mar. 19, 1935

1,994,474

UNITED STATES PATENT OFFICE 1,994,474

OPTICAL SYSTEM

James C. Karnes, Buffalo, N. Y.

Application July 15, 1933, Serial No. 680,579

2 Claims. (Cl. 88—29)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an optical system and to a method of obtaining stereoscopic effect.

As is well known true stereoscopic effect is based upon the fact that the two eyes of an observer are spaced and view an object from different points. The right eye sees the front face of the object and a portion of the right hand side while the left eye sees the front face and a much foreshortened image of the left side. The images presented to the two eyes are different and, entirely unconsciously and as a result of experience, this is interpreted in terms of relief. The eyes, unaided, are capable of stereoscopic vision in only one plane.

The purpose of this invention is to provide an optical system and a method whereby stereoscopic vision in two planes may be obtained.

One embodiment of the invention is illustrated in the accompanying drawing, in which:

Fig. 1 is a view in rear elevation of an optical system arranged in accordance with the invention.

Fig. 2 is a plan view of Fig. 1.

Fig. 3 is a view in rear elevation showing the images received by the eyes.

Referring to the drawing by characters of reference,

The optical system consists generally of two eyepieces 5—5 including pentaprisms 6—6 for deflecting light rays to the eyepieces, horizontally spaced pentaprisms 7—7 and horizontally and vertically spaced pentaprisms 8—8. The horizontal and vertical distances between the prisms 8—8 are preferably, though not necessarily, equal. At least one of the prisms 8 is out of the plane of the eyepiece group.

The light rays received and transmitted by the prisms 8 are deflected by the prisms 7 and directed to the prisms 6. The provision and disposition of the prisms 7 are for conveniently adapting the optical system to the inclusion of the additional elements necessary in a range finder. Any reflecting system for conducting the light rays from the prisms 8 to the eyepieces may be employed. It is also to be understood that the pentaprisms 6 and 8 may be replaced by appropriate deflecting elements of equivalent function.

The images presented by this optical system are shown in Fig. 3. The left eye sees the front face 9 of the object and a foreshortened view of the left side 10 and top 11. The right eye sees the front face 9 and a foreshortened view of the right side 12 and bottom 13. The images will be interpreted in terms of relief in both the horizontal and vertical directions so that the composite picture will show relief on all sides of the object.

When the optical system is adapted to photography, the eyepieces may be considered as light emergent members, and in this case Fig. 3 represents the photographic film or plate. The images or photographs as shown in Fig. 3 may be produced without using the optical system, the conditions for stereoscopic parallax in two planes being fulfilled when the cameras are displaced vertically and horizontally or in different planes with reference to an axis of binocular vision.

I claim:

1. An optical system having a pair of light emergent members spaced according to interpupillary distance, reflecting members on opposite sides of the light emergent members, said reflecting members spaced equal horizontal distances from the emergent members, light incident members on opposite sides of an axis containing the reflecting members, said light incident members spaced equal vertical distances from the reflecting members and spaced vertically from each other an amount corresponding to the horizontal spacing between the reflecting members.

2. The method of producing stereoscopic effect in two planes which consists in selecting a first image having light rays of an object, directing said rays downwardly a selected distance, then directing the rays horizontally a selected distance to a point for observation of said rays, selecting a second image having light rays of the same object, directing said rays upwardly a distance corresponding to the distance of the downward direction of the rays of the first image, then directing the light rays of the second image horizontally to a point for observation over a distance corresponding to the distance of the horizontal direction of the rays of the first image and on a path towards the rays of the first image.

JAMES C. KARNES.